US009760521B2

(12) United States Patent
Avimor et al.

(10) Patent No.: US 9,760,521 B2
(45) Date of Patent: Sep. 12, 2017

(54) DETACHABLE FABRIC CARD

(75) Inventors: Uri Avimor, Herzliya (IL); Yoav Gvili, Herzliya (IL)

(73) Assignee: TEJAS NETWORKS LIMITED, Bangalore (IN)

( * ) Notice: Subject to any disclaimer, the term of this patent is extended or adjusted under 35 U.S.C. 154(b) by 473 days.

(21) Appl. No.: 14/008,087

(22) PCT Filed: Aug. 11, 2011

(86) PCT No.: PCT/IN2011/000528
§ 371 (c)(1),
(2), (4) Date: Sep. 27, 2013

(87) PCT Pub. No.: WO2012/131691
PCT Pub. Date: Oct. 4, 2012

(65) Prior Publication Data
US 2014/0019659 A1    Jan. 16, 2014

(30) Foreign Application Priority Data
Mar. 31, 2011 (IN) .......................... 1097/CHE/2011

(51) Int. Cl.
*G06F 13/40* (2006.01)
*H04B 10/80* (2013.01)
(52) U.S. Cl.
CPC ....... *G06F 13/4068* (2013.01); *H04B 10/801* (2013.01)

(58) Field of Classification Search
CPC ......... G06F 13/00; G06F 13/40; H04L 12/00; H04L 12/5689
USPC ........... 710/100, 300–301; 370/351; 361/600
See application file for complete search history.

(56) References Cited

U.S. PATENT DOCUMENTS

| | | | |
|---|---|---|---|
| 6,349,037 B1* | 2/2002 | Draughn et al. | 361/788 |
| 6,996,116 B2* | 2/2006 | Engbersen et al. | 370/419 |
| 7,110,394 B1* | 9/2006 | Chamdani et al. | 370/355 |
| 7,274,080 B1* | 9/2007 | Parkin | 257/421 |
| 7,304,987 B1* | 12/2007 | James et al. | 370/360 |
| 7,466,924 B2* | 12/2008 | English et al. | 398/164 |
| 7,574,080 B2* | 8/2009 | Goodwill et al. | 385/24 |
| 7,706,255 B1* | 4/2010 | Kondrat et al. | 370/219 |
| 7,945,884 B1* | 5/2011 | Goergen et al. | 716/126 |
| 8,165,111 B2* | 4/2012 | Sharma et al. | 370/366 |
| 8,345,439 B1* | 1/2013 | Goergen et al. | 361/788 |
| 8,442,045 B2* | 5/2013 | Subramanian et al. | 370/389 |
| 8,654,680 B2* | 2/2014 | Subramanian et al. | 370/255 |
| 2005/0038949 A1* | 2/2005 | Patterson et al. | 710/315 |
| 2008/0181607 A1* | 7/2008 | Goodwill et al. | 398/50 |
| 2009/0251867 A1* | 10/2009 | Sharma et al. | 361/737 |
| 2014/0068286 A1* | 3/2014 | Nguyen et al. | 713/300 |

* cited by examiner

*Primary Examiner* — Christopher Shin
(74) *Attorney, Agent, or Firm* — Brundidge & Stanger, P.C.

(57) ABSTRACT

The invention relates to a detachable switch fabric card. In one embodiment this is accomplished by a fabric element including at least one chip to perform the switching between a plurality of fabric access card and two or more backplane connectors to match the backplane connectors.

6 Claims, 6 Drawing Sheets

DETACHABLE FABRIC CARD

FIELD OF THE INVENTION

This invention relates to telecommunications systems and more particularly to the design of switching equipment for telecommunications systems.

BACKGROUND OF THE INVENTION

Telecommunications providers are facing a more and more dynamic environment. As customer bandwidth requirements increase and more data ports are required the provider must be able to modify and scale their network. In this dynamic environment switching fabrics (example a cross connect or matrix etc) need to be designed to be easily scalable. As the provider modifies and scales their network the installed base of services must not be affected—it must be able to continue to generate revenue while the rest of the network is changed. The dynamic nature of the network also requires any scaling technique to be non-blocking that is any input can be connected to any unused output without affecting other inputs and outputs. The common approach to solving the problem is to use a centralized fabric design (e.g. fabric shelf) and interconnect to the line card ports in a particular fashion.

The limitation of this solution is the centralized fabric design adds more equipment and consequently increases cost in the shelves. Particularly, stacking of card triggers the problems of interconnectivity in the chassis. The centralized fabric design infrastructure does not scale easily (i.e. to expand a system either equipment needs to be torn out or underutilized equipment is initially installed). The centralized fabric design requires more inter-shelf cables to implement. Further, scaling the switch card fabric configuration leads to various complexities in the system.

Therefore, it would be desirable to have a scalable switch fabric card capacity without affecting the existing connectivity in the chassis to overcome the above limitations.

SUMMARY OF THE INVENTION

An aspect of the present invention is to address at least the above-mentioned problems and/or disadvantages and to provide at least the advantages described below.

Accordingly, an aspect of the present invention is to provide a daughter fabric card, including a fabric element including at least one chip to perform the switching between a plurality of fabric access card and at least one backplane connectors to match the backplane connectors.

In accordance with another aspect of the present invention provide a network element, comprising: a chassis having a housing and plurality of slots, a plurality of switch fabric cards, inserted within the plurality of slots to receive and transmit network traffic, wherein the plurality of switch fabric cards includes at least one daughter fabric card and a backplane, within the chassis and communicatively coupled to the plurality of switch fabric cards to transports the network traffic between the plurality of switch fabric cards.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
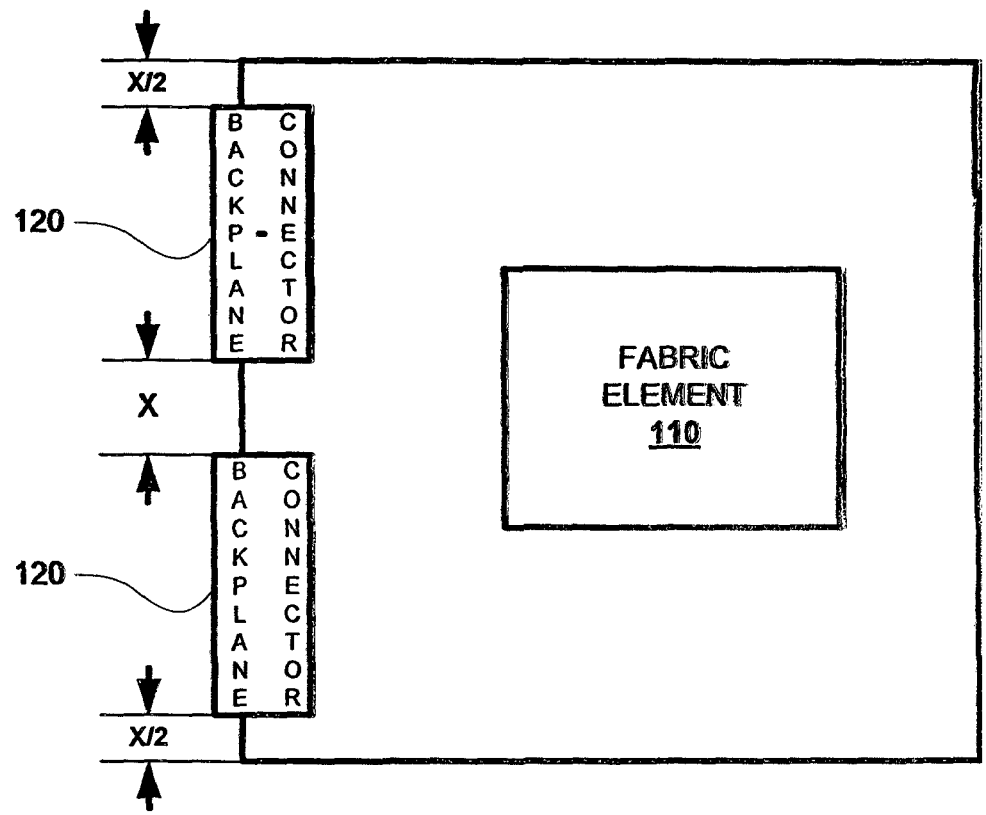
FIG. 1 illustrates a daughter fabric card according to an embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 6, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 demonstrates a daughter fabric card according to an embodiment of the present invention. The daughter fabric card includes two main components. One is the fabric element 110 having one or more chips which is capable of performing the actual switching between all the fabric access cards. Second element is a backplane connector including at least one or more (preferably two) backplane connectors 120. The backplane connector has to be matched with the corresponding connectors on the backplane. The distance between every two connectors on the daughter card is a constant value of 'X'. The distance between the connectors on the edge of the daughter card to the edge itself is smaller than 'X/2' (as shown in FIG. 1). The daughter fabric cards are placed on the Switch Fabric Card (SFC) which is the main card of all daughter cards. The switch fabric card may include control plane, power and other components not related directly to the data switching. The SFC is inserted in the chassis which is connected to the backplane of the chassis.

Figure 2:
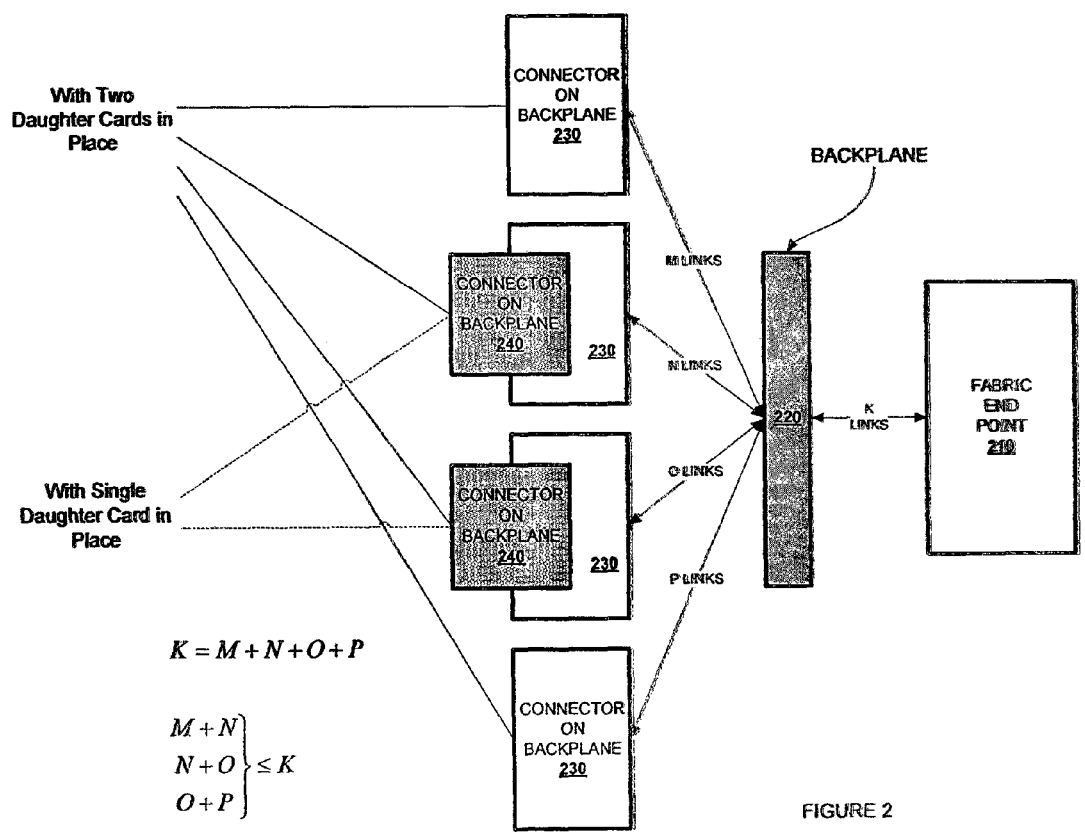
FIG. 2 shows links configuration connection of fabric access to the Switch Fabric Card (SFC) according to an example embodiment of the present invention.

FIG. 2 shows an example of links configuration connection of fabric access to the Switch Fabric Card (SFC). The configuration includes a fabric end point 210 representing a line card 220 with 'K' links. From the backplane to the SFC there are M+N+O+P links available on the connectors 230. The scalability of the module also allows using a scalable fabric end point, when low capacity is required, only O+N links are used. When full capacity all K links are used. When balanced M=N=O=P. Along with the SFC connector, a single Daughter Card (DC) 240 is attached. With a single DC on the SFC only O+N links are used. When two DCs are used, in the example all K links are connected to the SFC.

Figure 3:
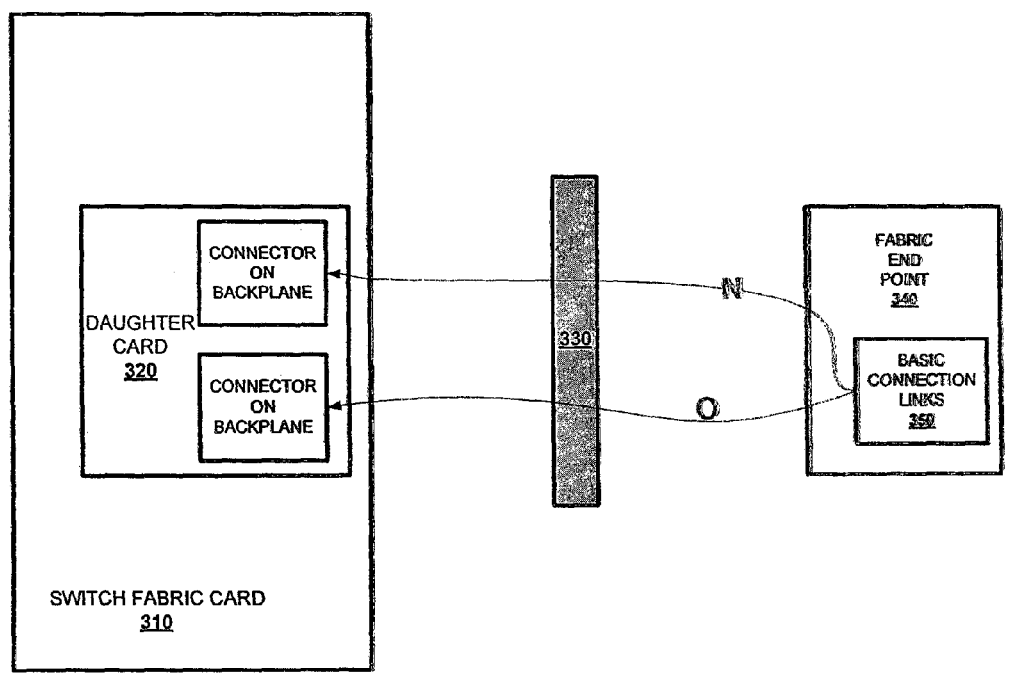
FIG. 3 illustrates a link capacity card connected to switch fabric card with a single daughter fabric card.
Figure 4:
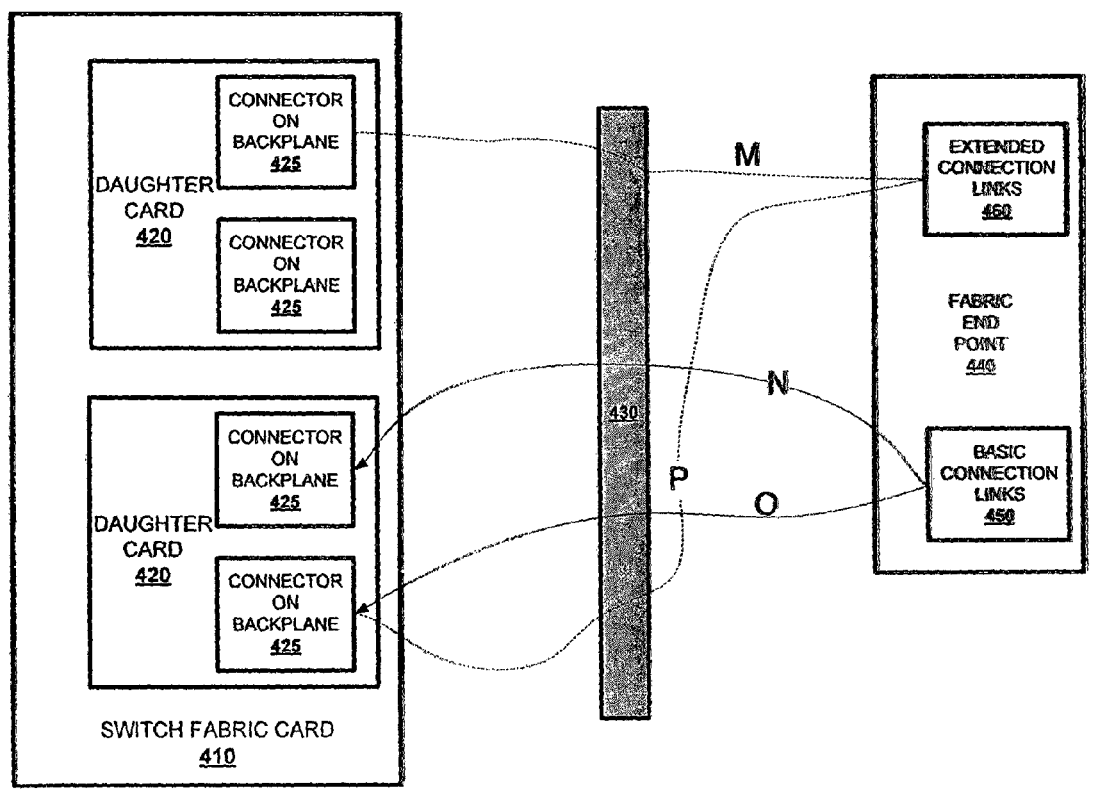
FIG. 4 illustrates extended link capacity card connected to switch fabric card with two daughter fabric cards.

It is also possible with structure of a chassis where there are several fabric end point card connected to the SFC through a backplane. All fabric end points card have data connectivity through the SFC. Considering a single Fabric end point card with only the basic link connectivity existing and it's connection to the SFC, where it is able to perform all the switching using a single DC, thus enabling a cost effective connectivity, this is shown in FIG. 3. Another configuration is required when the fabric end point requires both the basic and the extended connection links. The extended configuration requires use of a SFC with two DCs as seen in FIG. 4. Adding the extended links require more links to be handled in the SFC. By adding another DC and positioning it so the new added links M & P are connected to the existing links N & O. So on every fabric element both basic and extended links are connected creating a larger switching plane while retaining the current connectivity.

Figure 5:
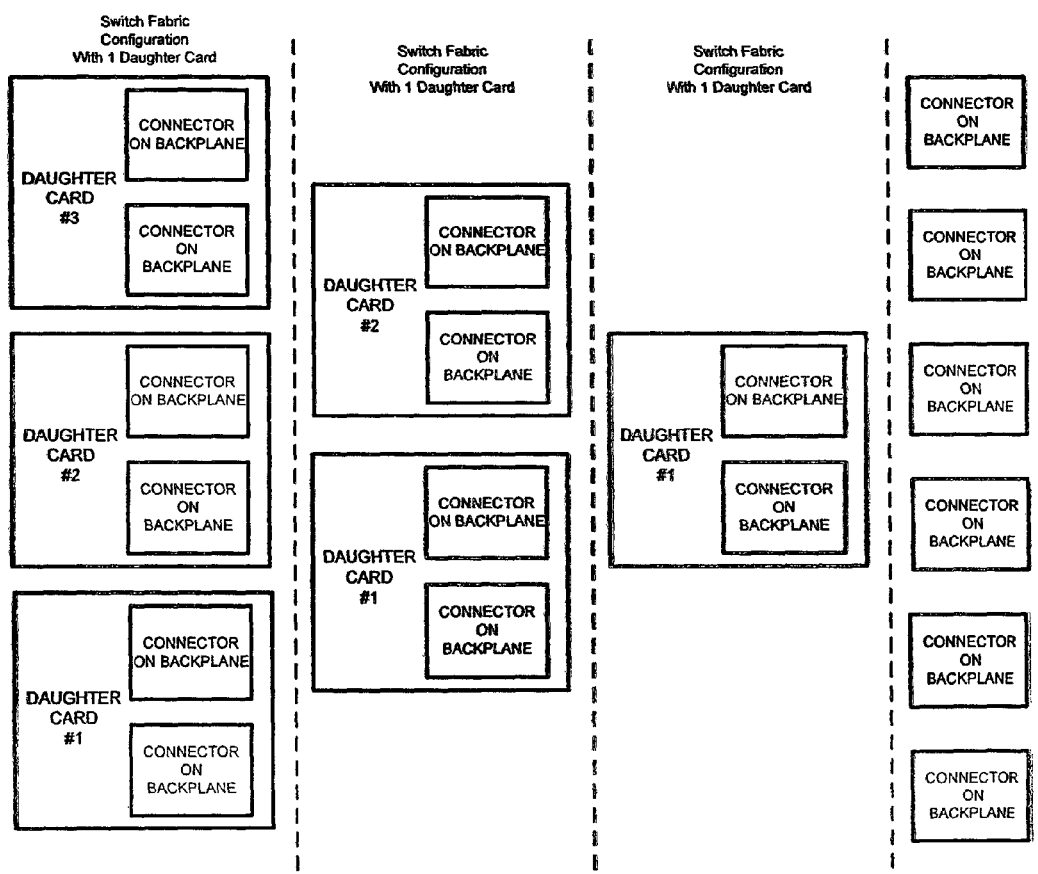
FIG. 5 shows an example of a six backplane connector according to one embodiment of the present invention.

FIG. 5 shows an example of a six backplane connector according to one embodiment of the present invention. There are six connectors on the backplane, and the each DC contains 2 connectors. This card construction provides with 3 different configurations of backplane allows using two, four or six connectors at a time.

Figure 6:
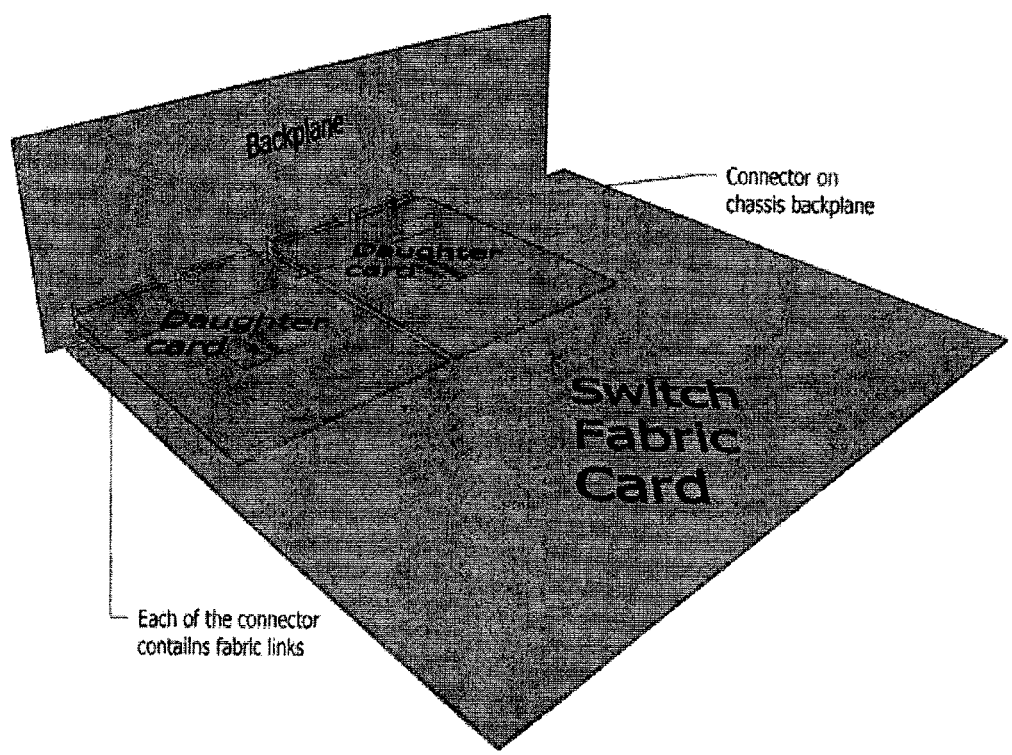
FIG. 6 shows a switch fabric card and backplane with two daughter fabric cards.

FIG. 6 shows a switch fabric card and backplane with two daughter fabric cards. The scalable fabric card has the possibility to upgrade the fabric capacity depending in the required switching capacity. The concept is that the fabric elements are on a daughter card. This daughter card is connected to the fabric card and is detachable. The daughter card can be placed in several configurations based on the required capacity. To enable a scalable switch fabric card capacity, the implication is that incrementing the capacity of the switch fabric card, which does not affect the existing connectivity in a chassis. Furthermore it provides increased capacity in switch fabric and enables the new added data links to coexist with the current data links on the same switching plane. This provides a full connectivity of the old and new data planes. Scaling up the switch fabric card is done by adding daughter cards on it. The location of the daughter cards varies depending on the required capacity and connectivity. Every daughter card contains both the fabric element and the backplane connectors. This allows an independent functionality for each daughter card.

One of ordinary skill in the art will recognize that the concepts taught herein can be tailored to a particular application in many other advantageous ways, and that the specific numbers and configurations presented are merely exemplary and instructive. For instance, all epochs need not be of the same length or any particular length. A switch fabric need not be implemented in a single integrated circuit, and indeed, the number of channels, strands, connections, etc. served by a given circuit is a design choice. A strand can be a single serial differential pair, but can be anything else that makes sense to the designer: two differential pairs, an optical fiber, a number of single-ended electrical connections, etc. Circuitry other than that described will preferably reside on each card, and some such circuitry has been alluded to herein. As ways of implementing such circuitry will be evident to those skilled in the art upon reading this disclosure, and such circuitry does not directly impact the salient features of the present invention, detailed description of such circuitry has been largely omitted to prevent this disclosure from burgeoning into a production manual.

Although the specification may refer to "an", "one", "another", or "some" embodiment(s) in several locations, this does not necessarily mean that each such reference is to the same embodiment(s), or that the feature only applies to a single embodiment.

We claim:

1. A network element, comprising:
   a chassis having a housing and plurality of slots;
   a plurality of switch fabric cards, inserted within the plurality of slots to receive and transmit network traffic, wherein the plurality of switch fabric cards include at least two daughter fabric cards and a main card, each of the at least two daughter fabric cards, comprising:
   a fabric element including at least one chip to perform switching between a plurality of fabric access card, and
   two backplane connectors, wherein a distance between two backplane connectors on respective daughter fabric cards is a predetermined distance equal to twice a distance between an edge, facing an outer edge of the respective daughter fabric cards, of respective two backplane connectors and the outer edge of the respective daughter fabric cards; and
   a backplane, within the chassis and communicatively coupled to the plurality of switch fabric cards to transport the network traffic between the plurality of switch fabric cards, wherein each of the two backplane connectors on the respective daughter fabric cards matches a respective connector on the backplane,
   wherein the main card is placed perpendicular to the backplane, and the each of the at least two daughter cards is placed perpendicular to the backplane and parallel to the main card, and wherein the at least two daughter cards are located on the same line.

2. The network element of claim 1, wherein the backplane includes a fabric end points which provides multiple paths between the pluralities of switch fabric cards.

3. The network element of claim 1, wherein the daughter card is detachable from the switch fabric card and also capable of functioning independently.

4. The network element of claim 1, wherein the combination of daughter cards on the switch fabric card allow using different configuration of fabric links arriving from the backplane enable to create a scalable configuration of switch fabric card without affecting the existing connectivity in the chassis.

5. The network element of claim 1, wherein the each of at least two daughter cards is capable of using a single fabric end point with only the basic link connectivity existing and its connection to the switch fabric card thereby able to perform all the switching.

6. The network element of claim 2, wherein the each of at least two daughter cards is capable of using a single fabric end point with only the basic link connectivity existing and its connection to the switch fabric card thereby able to perform all the switching.

* * * * *